United States Patent
Liu et al.

(10) Patent No.: US 12,527,553 B2
(45) Date of Patent: Jan. 20, 2026

(54) METHOD AND SYSTEM FOR CONTROLLING TIME GAIN COMPENSATION PHYSICAL SWITCHES

(71) Applicant: GE Precision Healthcare LLC, Waukesha, WI (US)

(72) Inventors: Gang Liu, Wuxi (CN); Xingti Liu, Wuxi (CN)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/762,481

(22) Filed: Jul. 2, 2024

(65) Prior Publication Data

US 2025/0009345 A1    Jan. 9, 2025

(30) Foreign Application Priority Data

Jul. 3, 2023   (CN) .......................... 202310808302.0

(51) Int. Cl.
*A61B 8/00* (2006.01)
*G01S 7/52* (2006.01)

(52) U.S. Cl.
CPC .............. *A61B 8/54* (2013.01); *A61B 8/4427* (2013.01); *A61B 8/463* (2013.01); *A61B 8/469* (2013.01); *G01S 7/52057* (2013.01)

(58) Field of Classification Search
CPC ......... A61B 8/54; A61B 8/4427; A61B 8/463; A61B 8/469; A61B 8/467; A61B 8/44; A61B 8/461; A61B 8/56; G01S 7/52057; G01S 7/52033; G01S 7/52074; G16H 30/00

See application file for complete search history.

(56) References Cited

U.S. PATENT DOCUMENTS

| | | | |
|---|---|---|---|
| 10,925,584 B2 | 2/2021 | Matsumura | |
| 2012/0190984 A1* | 7/2012 | Kim | ..................... A61B 8/5246 600/443 |
| 2015/0121277 A1 | 4/2015 | Yoon | |
| 2016/0081662 A1* | 3/2016 | Denk | ....................... A61B 8/54 600/437 |
| 2018/0353156 A1* | 12/2018 | Mehanian | ............ A61B 8/4444 |
| 2022/0008040 A1* | 1/2022 | Cho | .................... G01S 7/52074 |

\* cited by examiner

*Primary Examiner* — Kaitlyn E Sebastian
(74) *Attorney, Agent, or Firm* — SPQ IP LLC (57) ABSTRACT

A method for controlling a plurality of time gain compensation physical switches. The method includes: performing a current ultrasonic scan; determining current positions of the plurality of TGC physical switches; determining target positions of the plurality of TGC physical switches; and simultaneously displaying the current positions and the target positions of the plurality of TGC physical switches on a display. Some other embodiments of the present application further provide a system for controlling a plurality of time gain compensation physical switches, and a non-transitory computer-readable medium.

20 Claims, 6 Drawing Sheets

METHOD AND SYSTEM FOR CONTROLLING TIME GAIN COMPENSATION PHYSICAL SWITCHES

CROSS-REFERENCE TO RELATED APPLICATION

This application claim priority to Chinese Patent Application No. 202310808302.0, which was file on Jul. 3, 2023 at the Chinese Patent Office. The entire contents of the above-listed application are incorporated by reference herein in their entirety.

TECHNICAL FIELD

The present disclosure relates to the field of medical imaging, and in particular to a method for controlling a plurality of time gain compensation physical switches, a system for controlling a plurality of time gain compensation physical switches, and a non-transitory computer-readable medium.

BACKGROUND

Ultrasound imaging technology generally uses a probe to send an ultrasonic signal to a site to be scanned and receive an ultrasonic echo signal. The echo signal is further processed to obtain an ultrasound image of the site to be scanned. In ultrasound imaging, as the transmission depth of the ultrasonic signal within the site to be scanned increases, the ultrasonic echo signal will weaken due to the increased attenuation. Without processing, quality problems such as a decrease in brightness of the ultrasound image in the depth direction may ensue. Accordingly, time gain compensation (TGC) functions are widely used in ultrasound imaging systems. Briefly, TGC addresses the problem of ultrasound image attenuation at different depths by configuring different gains (including positive and negative gains) for echo signals received at different times.

Conventional TGC adjustment apparatuses include TGC physical switches and TGC virtual switches. Generally, TGC virtual switches are provided on a user interface such as a touch screen, and a user can implement TGC adjustment by manually operating a corresponding TGC virtual switch region on the touch screen. Moreover, since the positions of the TGC virtual switches are directly controllable by means of an algorithm, the ultrasound imaging system may even automatically control the positions of the switches, thereby automatically implementing TGC adjustment. TGC physical switches are typically a plurality of sliding switches arranged in a longitudinal (or depth) direction. Any of the sliding switches may be manually operated by sliding in a transverse direction to adjust the TGC value of the corresponding depth. Physical switches can provide good operational feedback for the user, and thus are still widely used. However, one disadvantage of physical switches is that they rely too much on manual operation. For example, compared with the automatic position adjustment of virtual switches, physical switches can only rely on manual operation.

SUMMARY

In some embodiments of the present application, a method for controlling a plurality of TGC physical switches is provided. The method comprises: performing a current ultrasonic scan; determining current positions of the plurality of TGC physical switches; determining target positions of the plurality of TGC physical switches; and simultaneously displaying the current positions and the target positions of the plurality of TGC physical switches on a display.

In some embodiments of the present application, a system for controlling TGC physical switches is provided. The system comprises: a probe, the probe being used to perform an ultrasound scan on a tissue to be imaged; a user interface, the user interface comprising the plurality of TGC physical switches; and a display, the display receiving a signal from the processor and performing a display operation. The processor is configured to execute the following method: performing a current ultrasonic scan; determining current positions of the plurality of TGC physical switches; determining target positions of the plurality of TGC physical switches; and simultaneously displaying the current positions and the target positions of the plurality of TGC physical switches on a display.

In some embodiments of the present application, a non-transitory computer-readable medium is provided, wherein the non-transitory computer-readable medium has a computer program stored therein, the computer program has at least one code segment, and the at least one code segment is executable by a machine so as to enable the machine to execute the following method: performing a current ultrasonic scan; determining current positions of the plurality of TGC physical switches; determining target positions of the plurality of TGC physical switches; and simultaneously displaying the current positions and the target positions of the plurality of TGC physical switches on a display.

It should be understood that the brief description above is provided to introduce, in a simplified form, concepts that will be further described in the detailed description. The brief description above is not meant to identify key or essential features of the claimed subject matter. The scope is defined uniquely by the claims that follow the detailed description. Furthermore, the claimed subject matter is not limited to implementations that solve any deficiencies raised above or in any section of the present disclosure.

BRIEF DESCRIPTION OF THE DRAWINGS

The present application will be better understood by reading the following description of non-limiting embodiments with reference to the accompanying drawings, where.

DETAILED DESCRIPTION

Specific embodiments of the present invention will be described below. It should be noted that in the specific description of the embodiments, it is impossible to describe all features of the actual embodiments of the present invention in detail, for the sake of brief description. It should be understood that in the actual implementation process of any embodiment, just as in the process of any one engineering project or design project, a variety of specific decisions are often made to achieve specific goals of the developer and to meet system-related or business-related constraints, which may also vary from one embodiment to another. Furthermore, it should also be understood that although efforts made in such development processes may be complex and tedious, for a person of ordinary skill in the art related to the content disclosed in the present invention, some design, manufacture, or production changes made on the basis of the technical content disclosed in the present disclosure are only common technical means, and should not be construed as the content of the present disclosure being insufficient.

Unless otherwise defined, the technical or scientific terms used in the claims and the description should be as they are usually understood by those possessing ordinary skill in the technical field to which they belong. "First", "second", and similar words used in the present invention and the claims do not denote any order, quantity, or importance, but are merely intended to distinguish between different constituents. The terms "one" or "a/an" and similar terms do not express a limitation of quantity, but rather that at least one is present. The terms "include" or "comprise" and similar words indicate that an element or object preceding the terms "include" or "comprise" encompasses elements or objects and equivalent elements thereof listed after the terms "include" or "comprise", and do not exclude other elements or objects. The terms "connect" or "link" and similar words are not limited to physical or mechanical connections, and are not limited to direct or indirect connections.

Figure 1:
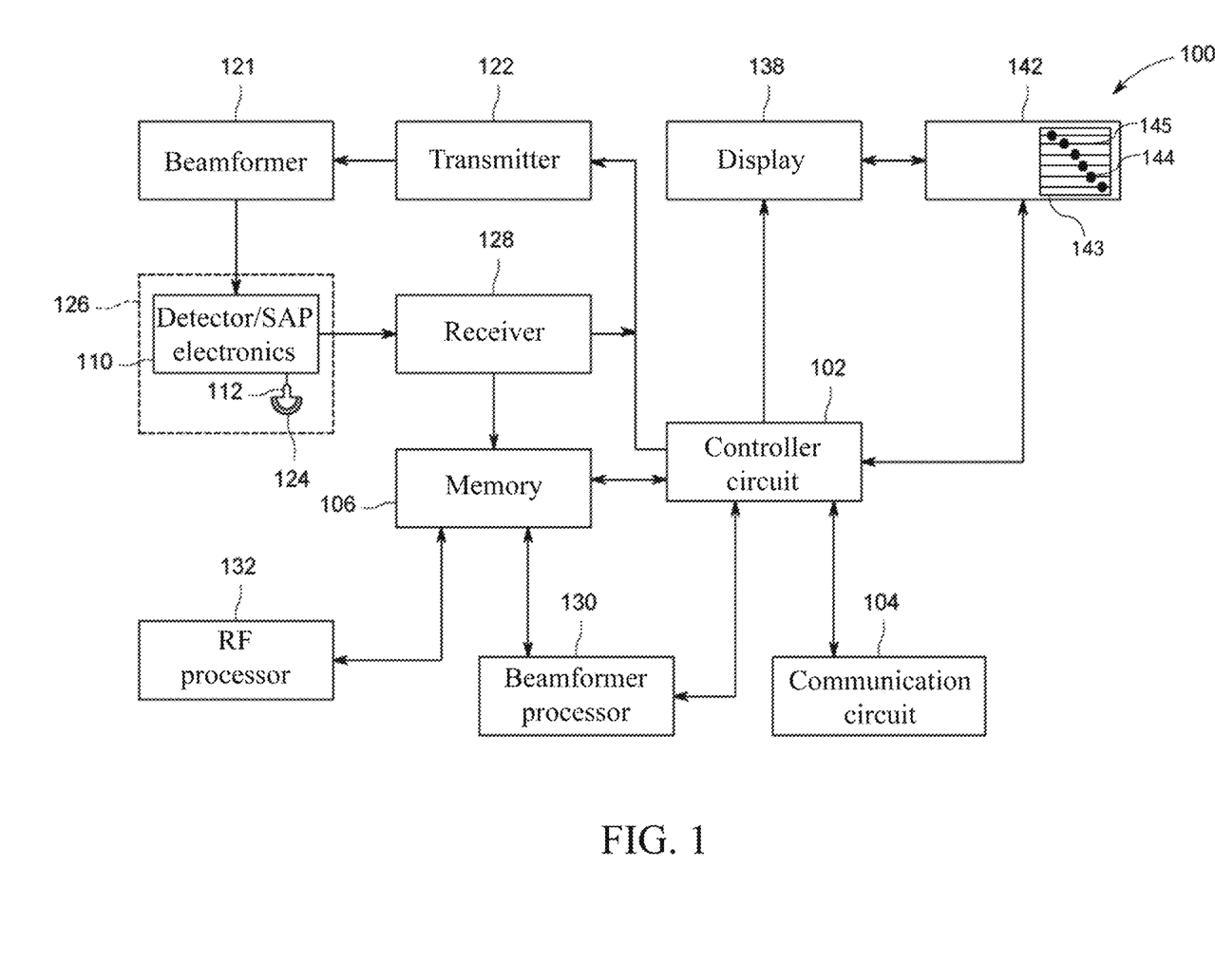
FIG. 1 is a schematic diagram of an ultrasound imaging system according to some embodiments of the present application.

FIG. 1 shows a schematic block diagram of an embodiment of an ultrasound imaging system 100. The ultrasound imaging system 100 may include a controller circuit 102, a display 138, a user interface 142, a probe 126 and a memory 106, which can be operatively connected to a communication circuit 104.

The controller circuit 102 is configured to control operation of the ultrasonic imaging system 100. The controller circuit 102 may comprise one or more processors. Optionally, the controller circuit 102 may comprise a central processing unit (CPU), one or more microprocessors, a graphics processing unit (GPU), or any other electronic component capable of processing inputted data according to a specific logic instruction. Optionally, the controller circuit 102 may comprise and/or represent one or more hardware circuits or circuit systems, and the hardware circuit or circuit system comprises, is connected to, or comprises and is connected to one or more processors, controllers, and/or other hardware logic-based apparatuses. Additionally or alternatively, the controller circuit 102 may execute an instruction stored on a tangible and non-transitory computer-readable medium (e.g., the memory 106).

The controller circuit 102 may be operatively connected to and/or control the communication circuit 104. The communication circuit 104 is configured to receive and/or transmit information along a bidirectional communication link with one or more alternate ultrasound imaging systems, remote servers, etc. The remote server may represent patient information, a machine learning algorithm, a remotely stored medical image from a previous scan, and/or a diagnosis and treatment period of a patient, etc. The communication circuit 104 may represent hardware for transmitting and/or receiving data along a bidirectional communication link. The communication circuit 104 may include a transceiver, a receiver, etc., and an associated circuit system (e.g., an antenna) for communicating (e.g., transmitting and/or receiving) with the one or more alternate ultrasound imaging systems, remote servers, etc., by using a wired and/or wireless means. For example, protocol firmware for transmitting and/or receiving data along a bidirectional communication link may be stored in the memory 106 accessed by the controller circuit 102. The protocol firmware provides network protocol syntax to the controller circuit 102 so as to assemble a data packet, establish and/or segment data received along the bidirectional communication link, and so on.

The bidirectional communication link may be a wired (e.g., by means of a physical conductor) and/or wireless communication (e.g., utilizing a radio frequency (RF)) link for exchanging data (e.g., a data packet) between the one or more alternative ultrasound imaging systems, remote servers, etc. The bidirectional communication link may be based on a standard communication protocol, such as Ethernet, TCP/IP, Wi-Fi, 802.11, a customized communication protocol, Bluetooth, etc.

The controller circuit 102 is operatively connected to the display 138 and the user interface 142. The display 138 may include one or more liquid crystal displays (e.g., light emitting diode (LED) backlights), organic light emitting diode (OLED) displays, plasma displays, cathode-ray tube (CRT) displays, and the like. The display 138 may display patient information, one or more medical images and/or videos, a graphical user interface, or an assembly received by the display 138 from the controller circuit 102, one or more 2D, 3D or 4D ultrasound image data sets from ultrasound data stored in the memory 106, or anatomical measurement, diagnosis, processing information, etc., currently acquired in real time.

The user interface 142 controls the operation of the controller circuit 102 and the ultrasonic imaging system 100. The user interface 142 is configured to receive an input from a clinician and/or an operator of the ultrasonic imaging system 100. The user interface 142 may include a keyboard, a mouse, a touch pad, one or more physical buttons, and the like. Optionally, the display 138 may be a touch screen display that includes at least a portion of the user interface 142. For example, a portion of the user interface 142 may correspond to a graphical user interface (GUI) that is generated by the controller circuit 102 and that is shown on the display 138. The touch screen display may detect the presence of a touch from the operator on the display 138, and may also identify the position of the touch relative to the surface area of the display 138. For example, a user may select, by touching or contacting the display 138, one or more user interface assemblies of the user interface (GUI) shown on the display. User interface assemblies may correspond to icons, text boxes, menu bars, etc., shown on the display 138. A clinician may select, control, and use a user interface assembly, interact with the same, and so on, so as to send an instruction to the controller circuit 102 to perform one or more operations described in the present application. For example, a touch may be applied using at least one among a hand, a glove, a stylus, and the like.

In some examples, the user interface 142 may include a plurality of TGC physical switches 143. The TGC physical switches 143 may be used to regulate TGC. In some embodiments, the TGC physical switches 143 may include sliding switches 144 and sliding rails 145. The sliding switches 144 correspond one-to-one with the sliding rails 145. As shown in FIG. 1, a plurality of sliding switches 144 may be sequentially arranged in a longitudinal direction (corresponding to the depth direction of an ultrasound image). Also, any one of the sliding switches 144 may be operated by sliding on the corresponding rail 145. It will be understood that, although not shown in the figure, the sliding switches 144 are further connected with circuits corresponding to the TGC physical switches to ensure that the position of each TGC physical switch can be detected and different TGC values can be assigned. The specific configuration and structure of the TGC physical switches may be any configuration and structure in the prior art, and will not be further described herein. In one non-limiting embodiment, when a sliding switch 144 is in the middle position on the corresponding rail 145, the corresponding TGC value thereof may be 0. When the sliding switch slides to the left, the corresponding TGC value thereof may represent a negative gain. The farther the distance of the leftward slide, the greater the degree of the represented negative gain. Conversely, when the sliding switch slides to the right, the corresponding TGC value thereof may represent a positive gain. The farther the distance of the rightward slide, the greater the degree of the represented positive gain. By positioning different sliding switches at different positions, the user can configure different TGC values for different depths of the ultrasound image. Typically, the assigned TCG value varies depending on the site to be imaged. For example, for more uniform sites to be imaged, such as muscle tissue, the TGC may gradually increase from shallow to deep. For special imaging sites such as the heart, the TGC adjustment may not follow the above rule due to the structural complexity thereof. In addition to the possibilities described above, the assigned TCG value also depends, to a large extent, on the usage habits and experience of the user. Therefore, the TGC may be frequently adjusted in an actual ultrasound scan. The TGC physical switches 143 provides the user with good tactile sensation and adjustment feedback. In some embodiments, the TGC physical switches 143 may be disposed on a control panel (not shown) of the ultrasound imaging system 100, such that when the user operates the TGC physical switches 143, their arms and hands can receive good support, thereby improving the user experience.

With continued reference to FIG. 1, the ultrasound imaging system 100 may include the probe 126, the probe 126 having a transmitter 122, a transmission beamformer 121, and a detector/subaperture processing (SAP) electronics 110. The detector/SAP electronics 110 may be used to control switching of transducer elements 124. The detector/SAP electronics 110 may also be used to group the transducer elements 124 into one or more sub-holes.

The probe 126 may be configured to acquire ultrasound data or information from tissues to be imaged (e.g., a fetus, organs, blood vessels, heart, bones, etc.). The probe 126 is communicatively connected to the controller circuit 102 by means of the transmitter 122. The transmitter 122 transmits a signal to the transmission beamformer 121 on the basis of acquisition settings received by the controller circuit 102. The acquisition settings may define the amplitude, pulse width, frequency, gain setting, scanning angle, power, time gain compensation (TGC), resolution, and the like of ultrasonic pulses emitted by the transducer elements 124. The transducer elements 124 emit a pulsed ultrasonic signal into a patient (e.g., the body). The acquisition settings may be defined by a user operating the user interface 142. The signal transmitted by the transmitter 122, in turn, drives a plurality of transducer elements 124 within a transducer array 112.

The transducer elements 124 transmit a pulsed ultrasonic signal to a body (e.g., a patient) or a volume that corresponds to an acquisition setting along one or more scanning planes. The ultrasonic signal may include, for example, one or more reference pulses, one or more push pulses (e.g., shear waves), and/or one or more pulsed wave Doppler pulses. At least a portion of the pulsed ultrasonic signal is backscattered from a tissue to be imaged (e.g., an organ, bone, heart, breast tissue, liver tissue, cardiac tissue, prostate tissue, newborn brain, embryo, abdomen, etc.) to produce an echo. Depending on the depth or movement, the echo is delayed in time and/or frequency, and received by the transducer elements 124 within the transducer array 112. The ultrasonic signal may be used for imaging, for producing and/or tracking a shear wave, for measuring changes in location or velocity within the anatomical structure and a compressive displacement difference (e.g., strain) of tissue, and/or for treatment and other applications. For example, the probe 126 may deliver low energy pulses during imaging and tracking, deliver medium and high energy pulses to produce shear waves, and deliver high energy pulses during treatment.

The transducer elements 124 convert a received echo signal into an electrical signal that can be received by a receiver 128. The receiver 128 may include one or more amplifiers, analog/digital converters (ADCs), and the like. The receiver 128 may be configured to amplify received echo signals after appropriate TGC, and convert analog signals received from the respective transducer elements 124 into digitized signals that are temporally uniformly sampled. The digitized signals representing the received echoes are temporarily stored in the memory 106. The digitized signals correspond to backscattered waves received by each transducer element 124 at different times. After being digitized, the signal may still retain the amplitude, frequency, and phase information of the backscattered wave.

Optionally, the controller circuit 102 may retrieve a digitized signal stored in the memory 106 for use in a beamformer processor 130. For example, the controller circuit 102 may convert the digitized signal into a baseband signal or compress the digitized signal.

The beamformer processor 130 may include one or more processors. If desired, the beamformer processor 130 may include a central processing unit (CPU), one or more microprocessors, or any other electronic assembly capable of processing inputted data according to specific logic instructions. Additionally or alternatively, the beamformer processor 130 may execute instructions stored on a tangible and non-transitory computer-readable medium (e.g., the memory 106) to perform beamforming computation using any suitable beamforming method, such as adaptive beamforming, synthetic emission focusing, aberration correction, synthetic aperture, clutter suppression, and/or adaptive noise control, among others. If desired, the beamformer processor 130 may be integrated with and/or be part of the controller circuit 102. For example, operations described as being performed by the beamformer processor 130 may be configured to be performed by the controller circuit 102.

The beamformer processor 130 performs beamforming on the digitized signal of the transducer elements, and outputs a radio frequency (RF) signal. The RF signal is then provided to an RF processor 132 for processing the RF signal. The RF processor 132 may include one or more processors. If desired, the RF processor 132 may include a central processing unit (CPU), one or more microprocessors, or any other electronic assembly capable of processing inputted data according to specific logic instructions. Additionally or alternatively, the RF processor 132 may execute instructions stored on a tangible and non-transitory computer-readable medium (e.g., the memory 106). If desired, the RF processor 132 may be integrated with and/or be part of the controller circuit 102. For example, operations described as being performed by the RF processor 132 may be configured to be performed by the controller circuit 102.

The RF processor 132 may generate, for a plurality of scanning planes or different scanning modes, different ultrasound image data types and/or modes, e.g., B-mode, color Doppler (e.g., color blood flow, velocity/power/variance), tissue Doppler (velocity), and Doppler energy, on the basis of a predetermined setting of a first model. For example, the RF processor 132 may generate tissue Doppler data for multiple scanning planes. The RF processor 132 acquires information (e.g., I/Q, B-mode, color Doppler, tissue Doppler, and Doppler energy information) related to multiple data pieces, and stores data information in the memory 106. The data information may include time stamp and orientation/rotation information.

Optionally, the RF processor 132 may include a composite demodulator (not shown) for demodulating an RF signal to generate an IQ data pair representing an echo signal. The RF or IQ signal data may be provided directly to the memory 106 so as to be stored (e.g., stored temporarily). As desired, output of the beamformer processor 130 may be delivered directly to the controller circuit 102.

The controller circuit 102 may be configured to process acquired ultrasound data (e.g., RF signal data or an IQ data pair), and prepare and/or generate an ultrasound image data frame representing the anatomical structure of interest so as to display same on the display 138. The acquired ultrasonic data may be processed by the controller circuit 102 in real time when an echo signal is received in a scanning or treatment process of ultrasound examination. Additionally or alternatively, the ultrasonic data may be temporarily stored in the memory 106 in a scanning process, and processed in a less real-time manner in live or off-line operations.

The memory 106 includes a parameter, an algorithm, one or more protocols of ultrasound examination, data values, and the like used by the controller circuit 102 to execute one or more operations described in the present application. The memory 106 may be a tangible and non-transitory computer-readable medium such as a flash memory, a random-access memory (RAM), a read-only memory (ROM), an electrically erasable programmable read-only (EEPROM), etc. The memory 106 may be used to store processed frames of acquired ultrasound data that are not scheduled to be immediately displayed, or may be used to store post-processed images (e.g., shear wave images and strain images), firmware or software corresponding to, for example, a graphical user interface, one or more default image display settings, programmed instructions, and the like. The memory 106 may store medical images, such as a 4D ultrasound image data set of ultrasound data, wherein such a 4D ultrasound image data set is accessed to present real-time 3D images. For example, the 4D ultrasound image data set may be mapped to corresponding memory 106 and one or more reference planes. Processing of ultrasound data that includes the ultrasound image data set may be based in part on user input, e.g. a user selection received at the user interface 142.

The inventors have found that although physical TGC switches can provide advantages such as good operational feedback, precise operational sensitivity, etc., they also have certain drawbacks. In particular, as compared with virtual TGC switches, physical TGC switches rely on manual operation by the user. For example, for virtual TGC switches, the position of each virtual switch can be automatically adjusted by the ultrasound imaging system to implement automatic TGC adjustment. Moreover, since the switches are virtual, TGC parameters can easily be saved in the system for the next use. However, this is not the case with TGC physical switches. The position of each physical switch determines the corresponding TGC value, making it difficult to achieve efficient adjustment like virtual TGC.

Figure 2:
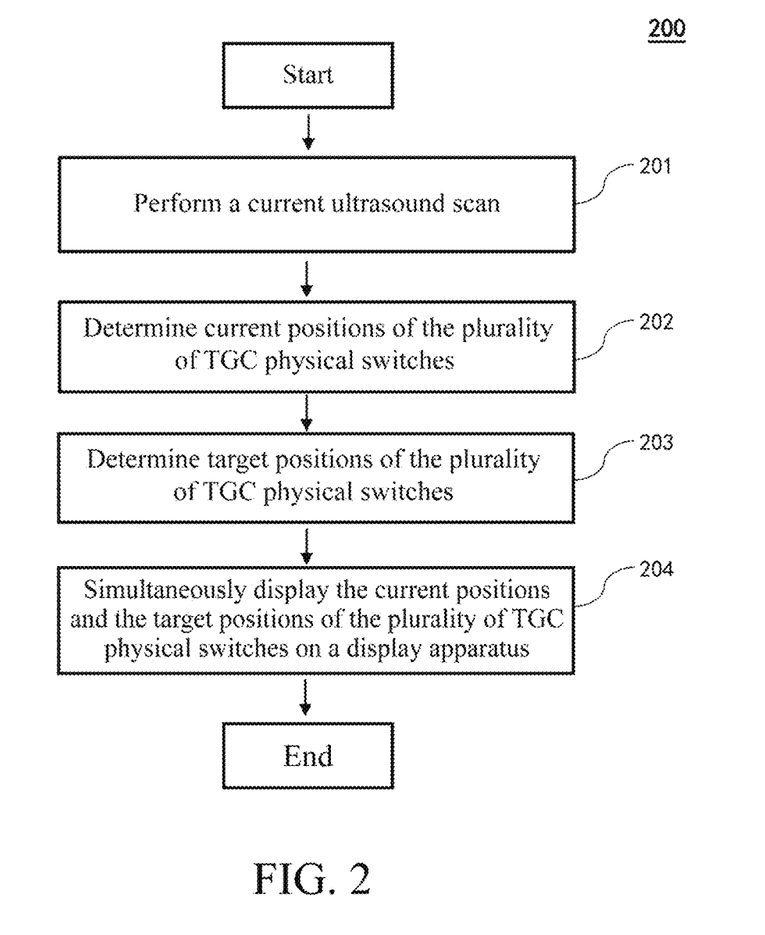
FIG. 2 is a flowchart showing how a plurality of time gain compensation physical switches are controlled in some embodiments of the present application.

In view of this, improvements are provided in the embodiments of the present application. With reference to FIG. 2, embodiments of the present application are described in detail. FIG. 2 illustrates a flowchart 200 showing how a plurality of time gain compensation physical switches are controlled in some embodiments of the present application.

In step 201, a current ultrasound scan is performed. The process may be implemented by the processor of the controller circuit 102 described above. Specifically, the processor may control a probe (e.g., the probe 126) to emit an ultrasonic signal to a site to be scanned, the ultrasonic signal being reflected within the site to be scanned and then received by the probe. The processor processes the ultrasonic echo signals received by the probe, that is, an ultrasound image of the site to be scanned can be obtained. As described above in the present application, the degree of attenuation of the ultrasonic echo signal varies at different depths. There is typically higher attenuation at positions with greater depths because of the far distance, and therefore higher TGC values need to be configured. There is typically lower attenuation at positions with shallower depths because of the close distance, and therefore lower TGC values need to be configured. The above configuration of the TGC value is implemented by operating a plurality of TGC physical switches by a user, which will not be further described herein.

In step 202, current positions of the plurality of TGC physical switches are determined. The process may be implemented by the processor. It will be understood that the position of each of the plurality of TGC physical switches determines the TGC value represented thereby. In one example, the processor can determine the specific position of any TGC physical switch according to the TCG value assigned to that switch. For example, if the TGC value controlled by a certain TGC physical switch is 0, it can be determined that the switch is located at the middle position. Alternatively, if the TGC value controlled by a certain TGC physical switch is a specific negative value, it can be determined according to the negative value that the switch is located at a certain distance to the left of the middle position. It should be noted that the above examples are only used for the purpose of clarifying the specific determination means of the positions of physical switches, and do not serve as a unique limitation. For example, the processor may also determine the positions of TGC physical switches by other means. For example, the positions thereof may be determined directly according to signals (such as impedance) generated by any of the TGC physical switches. The details will not be exhaustively described herein.

In step 203, target positions of the plurality of TGC physical switches are determined. The process may be implemented by the processor. The target positions may be determined by various means. For example, the target positions of the plurality of TGC physical switches may be determined according to target TGC values. As described above, TGC values and the positions of TGC physical switches have a correspondence relationship. Provided that the target TGC values are determined one by one, the processor can determine the target position corresponding to each TGC physical switch. In addition, the processor may also directly use required positions of the TGC physical switches as target positions, without relying entirely on the conversion of TGC values.

It should be noted that the setting of the target positions of the plurality of TGC physical switches described above may be manually performed or automatically determined by the ultrasound imaging system. Specific target position defining means and outstanding advantages thereof will be exemplarily described below.

In step 204, the current positions and the target positions of the plurality of TGC physical switches are simultaneously displayed on a display. After determining the current positions and the target positions of the plurality of TGC physical switches, the processor may map the positions of the physical switches to the display for virtual display. The position information displayed on the display may be displayed in a proportional manner according to the sizes, the positional relationship, etc., of the physical switches, and may be displayed in an enlarged or reduced manner according to factors such as the actual size of the display. However, it will be understood that the relative relationship between the current position and the target position of any one of the plurality of TGC physical switches is fixed. The simultaneously displayed target position and current position may be configured to be aligned on a display region for the same TGC physical switch. In this way, the difference between the target position and the current position, and the relative position, can be more intuitively reflected on the display, such as whether a certain TGC physical switch, compared with the target position thereof, is to the left, to the right, or is coincident therewith, and/or the distance by which the switch deviates from the target position, etc.

By means of the above embodiment, the user, when operating the plurality of TGC physical switches, can clearly see how any of the TGC physical switches should be adjusted to move toward the target position. This feature greatly alleviates the dependence on manual operations and experience. Without changing the usage habit of the user when operating the physical TGC switches, manpower can be greatly saved and working efficiency can be improved.

Figure 3:
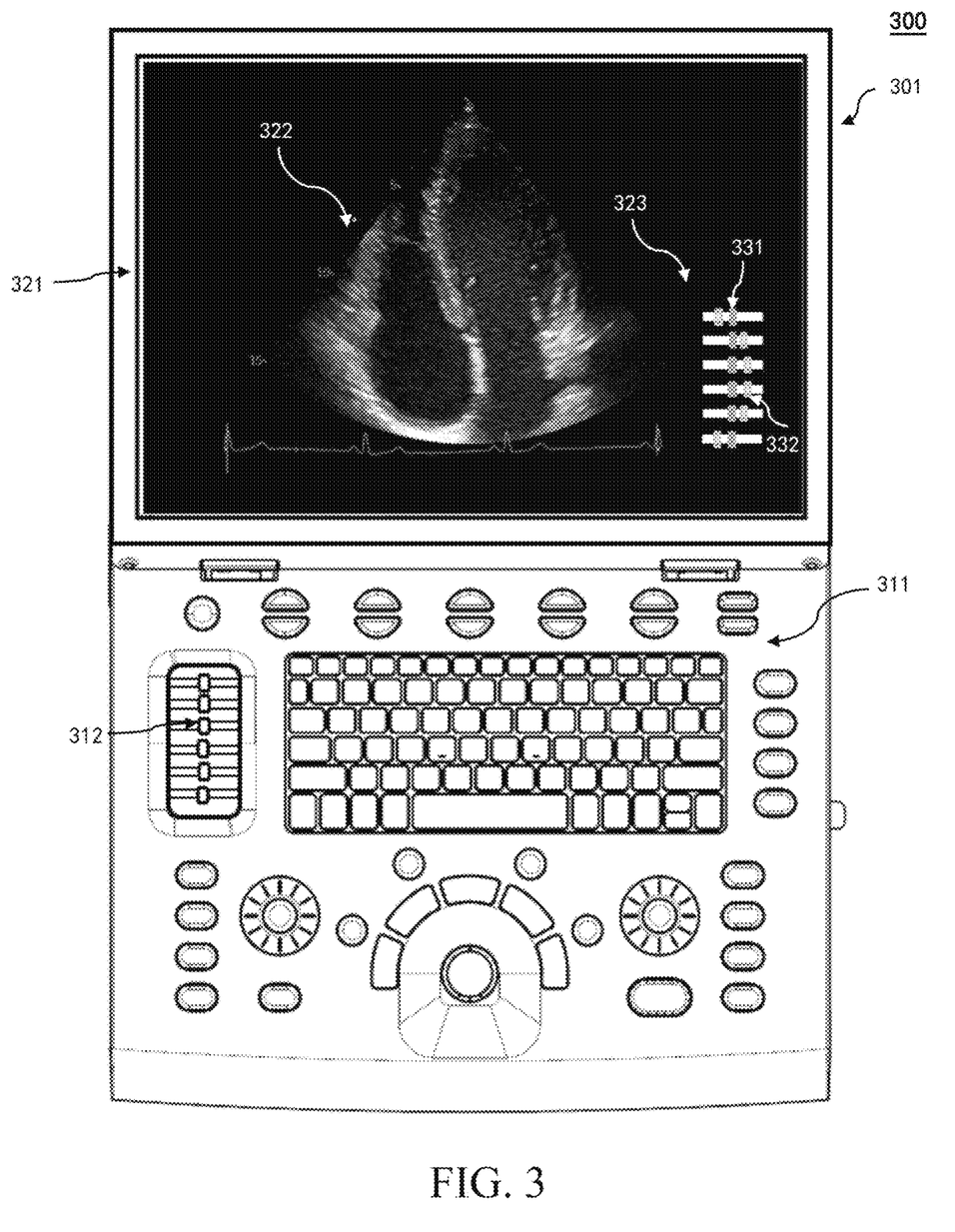
FIG. 3 is a schematic diagram displaying current positions and target positions of TGC physical switches on a display in some embodiments of the present application.

To further explicate the above embodiments of the present application, reference is made to FIG. 3. FIG. 3 shows a schematic diagram 300 displaying current positions and target positions of TGC physical switches on a display in some embodiments of the present application.

As shown in FIG. 3, an ultrasound imaging system 301 includes a user interface 311 and a display 321. It will be understood that the ultrasound imaging system 301 may further include the software/hardware structure of any of the above embodiments of the present application, for example, one or more of any structures of the ultrasound imaging system 100 shown in FIG. 1. A plurality of TGC physical switches 312 are included in the user interface 311. The plurality of TGC physical switches 312 can be slid under user operation to implement TGC adjustment.

Further, the display 321 may be used to display an ultrasound image 322. In some embodiments of the present application, the display 321 further includes a display region 323 for TGC switches. As shown in FIG. 3, virtual mapping of the TGC physical switches 312 is included in the display region 323, which shows the current positions 331 (indicated by blue switches in the figure) and the target positions 332 (indicated by green switches in the figure) of the TGC physical switches 312. The manner of determining the current positions and the target positions is as described in the above embodiments of the present application, which will not be described herein again. When TGC adjustment is needed, the user can clearly determine how to perform TGC adjustment to achieve the target TGC simply by observing the display region 323 on the display 321.

It should be noted that the target positions and the current positions shown in FIG. 3 are only one example in the present application. The two may also be distinguished in other manners. For example, any other color/shape or the like can be selected for distinguishing the two.

In addition, as described above in the present application, the target positions of the TGC physical switches in the present application may be determined in various manners. The embodiments of the present application will achieve different technical effects according to different determination manners. An exemplary description is provided below.

In some embodiments, determining the target positions of the plurality of TGC physical switches may include: performing image analysis of an ultrasound image in the current ultrasound scan, and determining the target positions on the basis of results of the analysis. For example, the processor may evaluate required TGC values according to image brightness non-uniformity caused by attenuation at different depths in a current ultrasound image (e.g., the ultrasound image 322), thereby obtaining the target positions of the TGC physical switches. Still using FIG. 3 as an example for illustration, the ultrasound image 322 represents a specific section of the heart, and due to the structural complexity and non-uniformity of the heart in the current image, the processor automatically determines that the target positions of the TGC physical switches should form a curved shape in depth. Therefore, the target positions can be automatically recommended for reference by the user.

The above configuration can provide guidance for novice doctors who are less skilled in the operation. In particular, for users who are not proficient in TGC adjustment, the automatic TGC determination and target position recommendation described above can improve scanning efficiency and image quality, and can perform a training function for the users.

Further, in some embodiments, determining the target positions of the plurality of TGC physical switches may include: recording positions of the plurality of TGC physical switches in a previous ultrasound scan, and using same as target positions in the current ultrasound scan.

The inventors have found that the TGC physical switches may be displaced due to inadvertent touching, resulting in the need to readjust the positions of the physical switches that have been set by the user. For example, when cleaning and disinfecting the ultrasound imaging system, the TGC physical switches are often disturbed, resulting in inconsistent TGC parameters before and after the disinfection. This results in a potential reduction in the comparability of ultrasound images between previous and next scans. This problem does not exist in virtual TGC, since it is usually not easy to incorrectly operate TGC switches on the touch screen. However, for physical switches, this problem still needs to be effectively solved. In the above embodiment of the present application, the positions of the plurality of TGC physical switches in the previous ultrasound scan are recorded and used as target positions of the TGC physical switches in the current ultrasound scan, thereby effectively solving the above problem. For example, the positions of the TGC physical switches are recorded in the system after the previous scan. Subsequently, even if the positions of the TGC physical switches are changed due to incorrect operation or cleaning and disinfection, when the current scan is performed again, the TGC physical switches can still be quickly adjusted to the positions at the time of the previous scan by means of the visualized indications of the target positions and physical positions.

In an optional embodiment, the positions of the TGC physical switches in the previous scan may further be combined with different scanned sites. For example, for a plurality of different tissues to be scanned, the positions of the TGC physical switches in the previous scan thereof are simultaneously recorded, and then according to the tissue to be scanned in the current scan, a corresponding record is selected as the target positions. Such a configuration makes the target positions more selective. As described above in the present application, different sites to be scanned typically need to be configured with different TGCs. The above configuration can be combined with historical TGC configurations and different scanned sites to provide diverse and targeted TGC physical switch guidance for the current scan.

According to some embodiments of the present application, the method for controlling the plurality of TGC physical switches may further include: determining a current TGC curve; determining a target TGC curve; and simultaneously displaying the current TGC curve and the target TGC curve on the display.

Such a configuration enables the user to more intuitively observe the topography of the current TGC curve and the topography of the target TGC curve on the display, so as to learn the differences between the two. The positions of the TGC physical switches can be adjusted in a more targeted manner.

Further, in some embodiments, the current TGC curve and the target TGC curve are configured to be displayed together within the same display region of the display. In other words, the current TGC curve and the target TGC curve may be configured to be displayed at the same coordinates. In other words, the two curves are configured to be displayed in an overlapping manner. In this way, the two curves share the same coordinates in the depth direction (vertical direction) and the TGC value direction (horizontal direction), so that TGC values at the same depth can be directly compared, thereby making the comparison result more intuitive. For better illustration, reference is made to FIG. 4, which shows a display screen 400 showing TGC physical switches and TGC curves in some embodiments of the present application.

Figure 4:
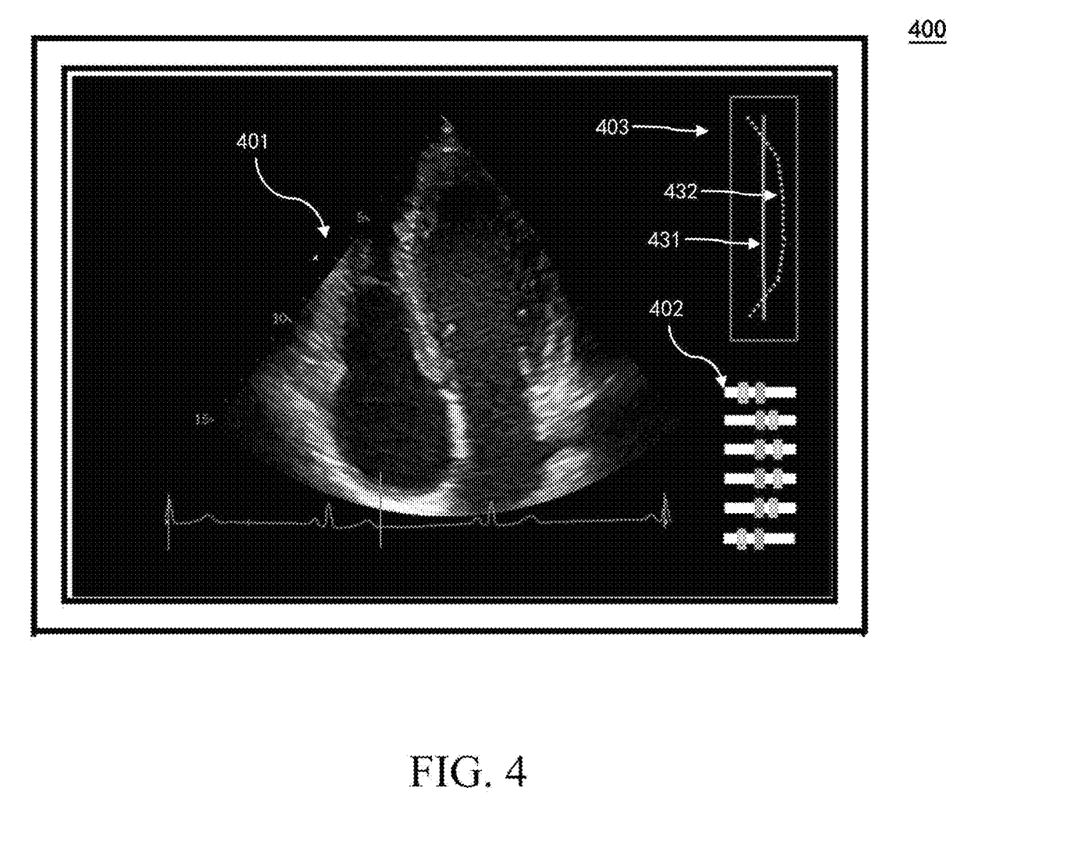
FIG. 4 is a display screen showing TGC physical switches and TGC curves in some embodiments of the present application.

As shown in FIG. 4, in addition to displaying a real-time ultrasound image 401, the display screen 400 further includes a TGC switch display region 402 and a TGC curve display region 403. The TGC switch display region 402 simultaneously displays the current positions and the target positions of the plurality of TGC physical switches (as described in any of the above embodiments). The TGC curve display region 403 includes a current TGC curve 431 and a target TGC curve 432. The shape of the current TGC curve 431 is similar to the arrangement of the current positions of the TGC physical switches. The shape of the target TGC curve 432 is similar to the arrangement of the target positions of the TGC physical switches. By simultaneously displaying the curves 431 and 432, the user can more intuitively learn the trend of the TGC in the depth direction, thereby facilitating decision-making.

It will be understood that, for conciseness of description, the specific configurations of the ultrasound imaging system and the TGC physical switches thereof are not shown in FIG. 4. The specific ultrasound imaging system may be as described in any of the above embodiments of the present application, and will not be described herein again. In addition, for ease of description, TGC connecting lines are collectively referred to as TGC curves in the present application, but it will be understood that in some scenarios, the TGC curve will be represented in the form of straight line segments.

The inventors have further found that there is a high degree of coincidence between the TGC curve and the positions of the TGC switches. A combination of the two will save screen space and help the user focus attention. Accordingly, improvements are further proposed in some embodiments of the present application. Specifically, the current TGC curve is configured as a line connecting the current positions of each of the plurality of TGC physical switches displayed on the display; and the target TGC curve is configured as a line connecting the target positions of each of the plurality of TGC physical switches displayed on the display. For clearer illustration, reference is made to FIG. 5, which shows a display screen 500 showing TGC physical switches and TGC curves in some other embodiments of the present application.

Figure 5:
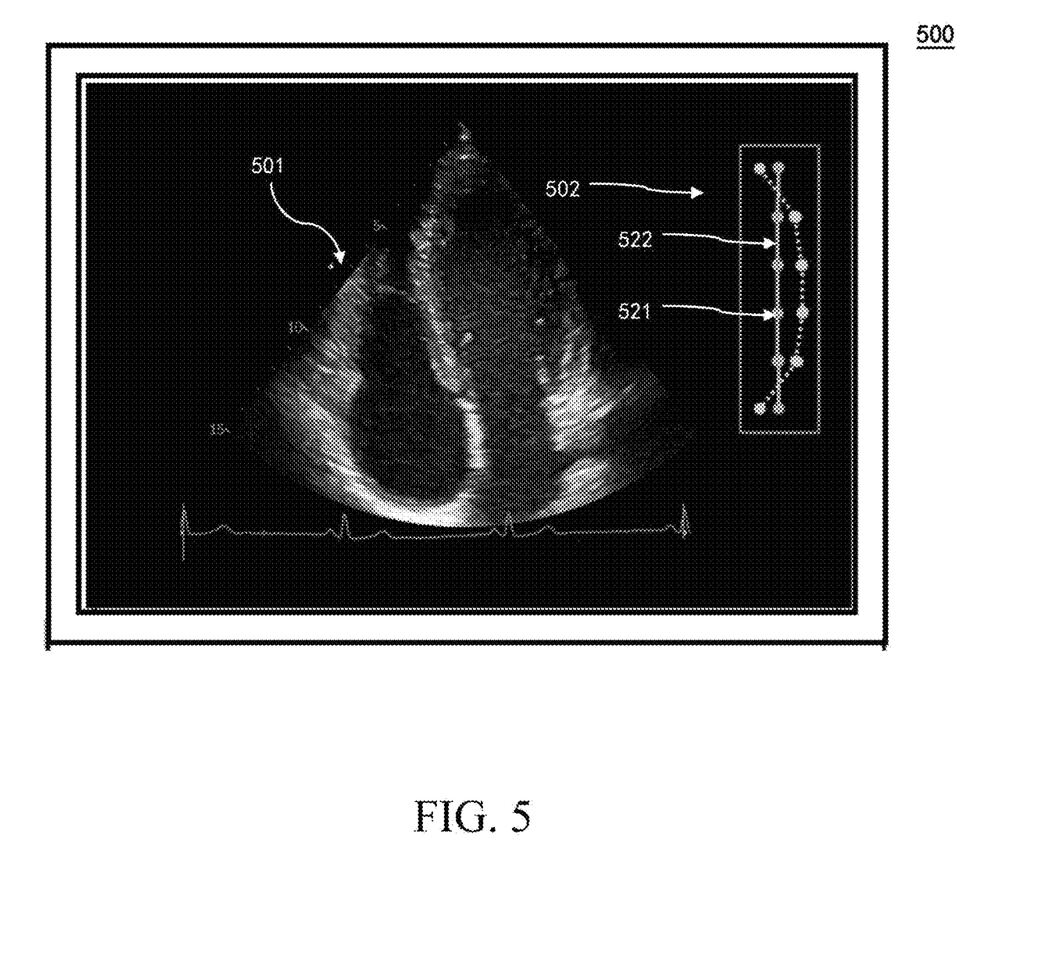
FIG. 5 is a display screen showing TGC physical switches and TGC curves in some other embodiments of the present application.

As shown in FIG. 5, in addition to displaying a real-time ultrasound image 501, the display screen 500 further includes a TGC display region 502. Unlike the split display of FIG. 4, the display region 502 of FIG. 5 includes both the display of the positions of TGC switches 521 and the display of a TGC curve 522. First, upon observation of the current TGC (including the current TGC switch positions and the current TGC curve), virtual mappings of the current positions of a plurality of TGC physical switches are arranged in sequence in the depth direction. The switches representing the current positions are connected by line segments to form the current TGC curve as a whole. Second, the target TGC (including the target TGC switch positions and the target TGC curve) is also configured in a similar manner. Virtual mappings of the target positions of the plurality of TGC physical switches are arranged in sequence. The switches representing the target positions are connected by line segments to form the target TGC curve as a whole. In this way, when the user observes the TGC curve or performs a TGC operation, the user does not need to constantly shift their gaze, and can complete the task by focusing only on the display region 502.

It should be noted that, in any embodiment, the respective connecting lines of the target TGC curve and the current TGC curve may be composed of different kinds of line segments, for example, using solid and dashed lines, respectively, so that the user can distinguish between the two more easily.

The inventors have further found that the user, when manually adjusting the TGC physical switches, may need to observe the positions of the physical switches as well as the ultrasound image or TGC on the screen. This may cause the distraction of the user's attention and reduce work efficiency. Accordingly, many improved solutions are proposed in some embodiments of the present application. A detailed description is provided below.

In some embodiments, in response to one of the plurality of TGC physical switches being moved, the operated TGC physical switch is highlighted on the display. In such a configuration, when the user operates a physical switch on the user interface, the user no longer needs to observe the physical switch, but only needs to focus on the physical switch mapping or the TGC curve mapping on the screen, as the highlighted TGC physical switch can be easily seen. It will be understood that no additional device is required to detect which TGC physical switch has been moved. For example, among the plurality of TGC physical switches, a physical switch with a changed electrical signal can be determined to be the one that is being moved, and then highlighted on the display. Various ways of highlighting may be used. For example, the switch may be highlighted in a color different from that of the physical switches that are not operated. Alternatively, the size of the operated switch may be enlarged and so on, which will not be exhaustively described herein.

In some embodiments, in response to one of the plurality of TGC physical switches being moved, a relative positional relationship of the current position to the target position of the moved TGC physical switch is determined; and a visual or auditory indication for the movement thereof is provided on the basis of the relative positional relationship. For example, when the processor detects that a TGC physical switch is currently moved, the processor may also determine whether the target position corresponding thereto is to the left or right of its current position, or is aligned with the current position. On the basis of the above determination result, a visual or auditory indication may be provided for moving the TGC physical switch. For example, the visual indication may include, but is not limited to, a visual prompt such as an arrow. When the target position is on the left side of the current position, an arrow toward the left may be displayed. Regarding the auditory indication, when the target position is on the left side of the current position, a voice prompt such as "moving toward the left" may be directly generated. The same applies to other cases. Such a configuration enables a user to easily and quickly make a decision to adjust the positions of the TGC physical switches.

In some embodiments, a first visual display operation is performed to display current positions of TGC physical switches that are different from target positions thereof; and a second visual display operation is performed to display current positions of TGC physical switches that are identical to target positions thereof; the first visual display operation is different from the second visual display operation. Such a configuration can further assist the user in quickly determining which one or more of the plurality of TGC physical switches have/have not been moved to the target position(s). In one example, the difference between the above visual display operations may be a difference in color. In another example, the difference between the above visual display operations may be a difference in display size. Alternatively, the difference may be a combination of the above two.

Figure 6:
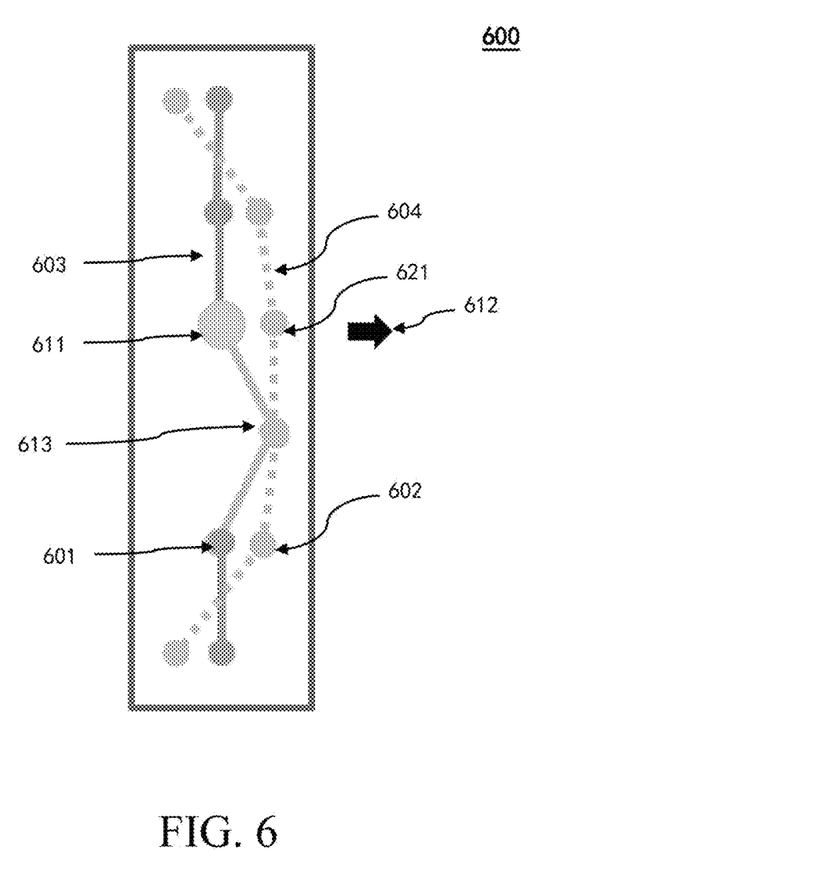
FIG. 6 is a schematic diagram of a TGC display region in some embodiments of the present application.

In order to explain the above embodiments more clearly, and make the advantages more easily appreciated, reference is made to FIG. 6, which shows a schematic diagram of a TGC display region 600 in some embodiments of the present application. The ultrasound imaging system and the additional equipment thereof are not shown in FIG. 6. The specific ultrasound imaging system may be as described in any of the above embodiments of the present application, and will not be described herein again.

The TGC display region 600 may simultaneously include a TGC physical switch current position 601, a TGC physical switch target position 602, a current TGC curve 603, and a target TGC curve 604. However, it will be understood that the TGC curve and the TGC switches may also be displayed separately as described in the above embodiments of the present application.

When a switch 611 is operated, the processor may highlight same. For example, the switch 611 is displayed in a different color, and/or is displayed in an enlarged manner. In this way, the operator can intuitively recognize that the switch 611 is being operated.

Further, the switch 611 is to the right of a target position 621 thereof, and accordingly, the processor may generate a movement indication, such as an arrow 612, near the switch 611. The arrow 612 is to the right of the switch 611, and/or, points to the right. This means that at this time the user needs to slide the switch 611 to the right until the current position of the switch 611 coincides with the target position 621. In this way, the user can react quickly and sensitively to the adjustment of the switch 611.

Further, as shown in FIG. 6, the current position and the target position of the switch 611 do not coincide (there is a difference therebetween). The current position and the target position of a switch 613 coincide (there is no difference therebetween). Accordingly, different visual display effects can be configured for switches in different states. For example, the color of the switch 612 is configured to be the same as the color of the target position thereof. In this way, the user can very intuitively learn from the display which switches still need to be adjusted.

In an optional embodiment, when the TGC curve and the TGC switch positions are displayed in combination as shown in FIG. 6, the switching of the visual display operations may further include the connecting-line segments near the switches (e.g., the upper and lower connecting-line segments of the switch 612).

It should be noted that the above figure shows an embodiment in which the TGC curve and the TGC switches are displayed in the same display region, but the above embodiment of the present application is equally applicable when the curve and the switches are displayed separately. In addition, for the purposes of brevity and conciseness, the applicant integrates various embodiments and combinations thereof in FIG. 6. However, those skilled in the art could understand that FIG. 6 and the other above embodiments of the present application may be arbitrarily selected or combined.

Some embodiments of the present application further provide a system for controlling a plurality of TGC physical switches. The system may be the ultrasonic imaging system as shown in FIG. 1, or may be any other one. The system includes: a probe, the probe being used to perform an ultrasound scan on a tissue to be imaged; a user interface, the user interface comprising the plurality of TGC physical switches; a processor, configured to execute the method in any of the above embodiments; and a display, receiving a signal from the processor and performing a display operation.

Some embodiments of the present invention further provide a non-transitory computer-readable medium storing a computer program, wherein the computer program has at least one code segment, and the at least one code segment is executable by a machine so that the machine performs steps of the method in any of the embodiments described above.

Correspondingly, the present disclosure may be implemented by means of hardware, software, or a combination of hardware and software. The present disclosure may be implemented in at least one computer system in a centralized manner, or implemented in a distributed manner; and in the distributed manner, different elements are distributed on a plurality of interconnected computer systems. Any type of computer system or other apparatus suitable for implementing the methods described herein is considered to be appropriate.

Various embodiments may also be embedded in a computer program product, which includes all features capable of implementing the methods described herein, and the computer program product is capable of executing these methods when loaded into a computer system. The computer program in this context means any expression in any language, code, or symbol of an instruction set intended to enable a system having information processing capabilities to execute a specific function directly or after any or both of the following: a) conversion to another language, code, or symbol; and b) replication in different material forms.

The purpose of providing the above specific embodiments is to facilitate understanding of the content disclosed in the present invention more thoroughly and comprehensively, but the present invention is not limited to these specific embodiments. Those skilled in the art should understand that various modifications, equivalent replacements, changes and the like can also be made to the present invention and should be included in the scope of protection of the present invention as long as these changes do not depart from the spirit of the present invention.

The invention claimed is:

1. An ultrasound system, comprising:
    a user interface comprising a plurality of time gain compensation (TGC) physical switches;
    a display configured to display a virtual mapping of the plurality of TGC physical switches; and
    a processor configured to execute instructions to:
        control a probe to perform an ultrasonic scan;
        determine current positions of the plurality of TGC physical switches on the user interface;
        determine target positions of the plurality of TGC physical switches; and
        control the display to display the virtual mapping that simultaneously displays the current positions and the target positions of the plurality of TGC physical switches.

2. The system according to claim 1, wherein the processor is further configured to:
    determine a current TGC curve;
    determine a target TGC curve; and
    control the display to simultaneously display the current TGC curve and the target TGC curve on the display.

3. The system according to claim 2, wherein
    the current TGC curve and the target TGC curve are configured to be displayed together within a same display region of the display.

4. The system according to claim 2, wherein
    the current TGC curve is configured as a line connecting the current positions of each of the plurality of TGC physical switches displayed on the display; and
    the target TGC curve is configured as a line connecting the target positions of each of the plurality of TGC physical switches displayed on the display.

5. The system according to claim 1, wherein the processor is further configured to:
    in response to one of the plurality of TGC physical switches being moved on the user interface, highlight the moved TGC physical switch on the display.

6. The system according to claim 5, wherein the processor is further configured to:
    in response to one of the plurality of TGC physical switches being moved on the user interface, determine a relative positional relationship between the current position and the target position of the moved TGC physical switch; and
    on the basis of the relative positional relationship, provide a visual or auditory indication for the movement thereof.

7. The system according to claim 1, wherein the processor is further configured to:
    perform a first visual display operation to display current positions of TGC physical switches that are different from target positions thereof; and
    perform a second visual display operation to display current positions of TGC physical switches that are identical to target positions thereof; the first visual display operation being different from the second visual display operation.

8. The system according to claim 1, wherein determining the target positions of the plurality of TGC physical switches comprises:
    recording positions of the plurality of TGC physical switches in a previous ultrasound scan, and using the positions of the plurality of TGC physical switches in the previous ultrasound scan as the target positions in the ultrasonic scan.

9. The system according to claim 1, wherein determining the target positions of the plurality of TGC physical switches comprises:
    performing image analysis of an ultrasound image in the ultrasonic scan, and determining the target positions on the basis of results of the image analysis.

10. The system according to claim 1, wherein the TGC physical switches include physical sliding switches and physical sliding rails that are provided on the user interface that is physically separate from the display.

11. A method for controlling a plurality of time gain compensation (TGC) physical switches, the method comprising:
    performing a current ultrasonic scan;
    determining current positions of the plurality of TGC physical switches on a user interface;
    determining target positions of the plurality of TGC physical switches; and
    displaying, on a display, a virtual mapping that simultaneously displays the current positions and the target positions of the plurality of TGC physical switches.

12. The method according to claim 11, further comprising:
    determining a current TGC curve;
    determining a target TGC curve; and
    simultaneously displaying the current TGC curve and the target TGC curve on the display.

13. The method according to claim 12, wherein
    the current TGC curve and the target TGC curve are configured to be displayed together within a same display region of the display.

14. The method according to claim 12, wherein
    the current TGC curve is configured as a line connecting the current positions of each of the plurality of TGC physical switches displayed on the display; and
    the target TGC curve is configured as a line connecting the target positions of each of the plurality of TGC physical switches displayed on the display.

15. The method according to claim 11, further comprising:
    in response to one of the plurality of TGC physical switches being moved on the user interface, highlighting the moved TGC physical switch on the display.

16. The method according to claim 15, further comprising:
    in response to one of the plurality of TGC physical switches being moved on the user interface, determining a relative positional relationship between the current position and the target position of the moved TGC physical switch; and on the basis of the relative positional relationship, providing a visual or auditory indication for the movement thereof.

17. The method according to claim 11, further comprising:
performing a first visual display operation to display current positions of TGC physical switches that are different from target positions thereof; and performing a second visual display operation to display current positions of TGC physical switches that are identical to target positions thereof; the first visual display operation being different from the second visual display operation.

18. The method according to claim 11, wherein determining the target positions of the plurality of TGC physical switches comprises:
recording positions of the plurality of TGC physical switches in a previous ultrasound scan, and using the positions of the plurality of TGC physical switches in the previous ultrasound scan as the target positions in the current ultrasound scan.

19. The method according to claim 11, wherein determining the target positions of the plurality of TGC physical switches comprises:
performing image analysis of an ultrasound image in the current ultrasound scan, and determining the target positions on the basis of results of the image analysis.

20. A non-transitory computer-readable medium, the non-transitory computer-readable medium having a computer program stored therein, the computer program having at least one code segment, and the at least one code segment being executable by a machine to enable the machine to execute the steps of the method according to claim 11.

* * * * *